(12) United States Patent
Masunaga et al.

(10) Patent No.: US 10,498,191 B2
(45) Date of Patent: Dec. 3, 2019

(54) BUSH, ROTARY MACHINE, AND AIR CONDITIONING APPARATUS

(71) Applicant: Kabushiki Kaisha Toshiba, Minato-ku (JP)

(72) Inventors: Takayuki Masunaga, Yokohama (JP); Shanying Pan, Chigasaki (JP); Misuzu Sakai, Yokohama (JP); Toshihiko Kida, Yokohama (JP); Kaori Deura, Yokohama (JP); Kosuke Adachi, Yokohama (JP); Makoto Ootaki, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 146 days.

(21) Appl. No.: 15/904,899

(22) Filed: Feb. 26, 2018

(65) Prior Publication Data

US 2018/0262083 A1   Sep. 13, 2018

(30) Foreign Application Priority Data

Mar. 10, 2017 (JP) .................................. 2017-046352
Sep. 15, 2017 (JP) .................................. 2017-178345

(51) Int. Cl.
*H02K 11/00* (2016.01)
*H02K 7/00* (2006.01)
(Continued)

(52) U.S. Cl.
CPC ............ *H02K 7/003* (2013.01); *F24F 1/0022* (2013.01); *F24F 1/0047* (2019.02); *H02K 7/14* (2013.01);
(Continued)

(58) Field of Classification Search
CPC ...... H02K 5/1675; H02K 7/085; H02K 11/33; H02K 7/003; F04D 13/0633; F04D 13/026
(Continued)

(56) References Cited

U.S. PATENT DOCUMENTS 2,838,262 A * 6/1958 Anderson ............... F16F 1/376
  248/603
3,303,366 A * 2/1967 Elson ..................... B23D 45/16
  310/83
(Continued)

FOREIGN PATENT DOCUMENTS

JP   8-35526 A   2/1996
JP   3500438   2/2004
(Continued)

*Primary Examiner* — Thanh Lam
(74) *Attorney, Agent, or Firm* — Oblon, McClelland, Maier & Neustadt, L.L.P.

(57) ABSTRACT

According to an embodiment, a bush includes a first member, a second member, and a third member. The first member is provided with a first hole having a first axis, and has a first outer surface having a second axis different from the first axis. The second member is provided with a second hole in which the first member is housed, and has a second inner surface that is in contact with the first outer surface and a second outer surface having a third axis different from the second axis. The third member is provided with a third hole in which the second member is housed and has a third inner surface that is in contact with the second outer surface.

10 Claims, 13 Drawing Sheets

(51) Int. Cl.
  *H02K 11/33* (2016.01)
  *F24F 1/0022* (2019.01)
  *H02K 7/14* (2006.01)
  *F24F 1/0047* (2019.01)

(52) U.S. Cl.
  CPC ...... *H02K 11/33* (2016.01); *F24F 2203/1004* (2013.01)

(58) Field of Classification Search
  USPC ............................................ 310/60 R, 89–91
  See application file for complete search history.

(56) References Cited

U.S. PATENT DOCUMENTS

| | | | |
|---|---|---|---|
| 5,717,528 A | 2/1998 | Ihara et al. | |
| 6,069,794 A * | 5/2000 | Chuang | H01L 23/467 165/80.3 |
| 6,309,136 B1 * | 10/2001 | Kellenberger | F16D 1/094 403/374.3 |
| 6,318,358 B1 * | 11/2001 | Gatley, Jr. | F04D 25/082 126/110 R |
| 6,893,236 B2 * | 5/2005 | Jeong | F04C 29/0057 418/55.1 |
| 6,926,498 B2 * | 8/2005 | Li | F04D 29/329 310/156.26 |
| 8,840,379 B2 * | 9/2014 | Wang | F04D 25/0606 310/261.1 |
| 2008/0058143 A1 | 3/2008 | Fukuda | |
| 2010/0124510 A1 * | 5/2010 | Hsu | F04D 29/056 417/423.7 |
| 2013/0004304 A1 | 1/2013 | Teshima et al. | |

FOREIGN PATENT DOCUMENTS

| | | |
|---|---|---|
| JP | 2008-57557 | 3/2008 |
| JP | 2010-274394 | 12/2010 |
| JP | 2011-131321 | 7/2011 |
| JP | 2012-92810 | 5/2012 |
| JP | 2013-15038 | 1/2013 |

\* cited by examiner

BUSH, ROTARY MACHINE, AND AIR CONDITIONING APPARATUS

CROSS-REFERENCE TO RELATED APPLICATIONS

This application is based upon and claims the benefit of priority from Japanese Patent Application No. 2017-046352, filed on Mar. 10, 2017 and Japanese Patent Application No. 2017-178345, filed on Sep. 15, 2017, the entire contents of which are incorporated herein by reference.

FIELD

Embodiments described herein relate generally to a bush, a rotary machine, and an air conditioning apparatus.

BACKGROUND

In a rotary machine that rotate a rotating body such as a fan, a bush connects a shaft of a power source such as a motor and the rotating body such as a fan. The shaft is inserted into a hole provided in the bush, and the rotating body is connected to the outer surface of the bush, for example.

The center of gravity of the bush and the rotating body may be eccentric relative to the shaft. In this case, when the bush and the rotating body rotate, vibration may occur in the rotating body.

DETAILED DESCRIPTION

According to an embodiment, a bush includes a first member, a second member, and a third member. The first member is provided with a first hole having a first axis, and has a first inner surface defining the first hole and a first outer surface that is positioned opposite to the first inner surface and has a second axis. The second axis is different from the first axis. The second member is provided with a second hole that is coaxial with the first outer surface and in which the first member is housed, and has a second inner surface that defines the second hole and is in contact with the first outer surface and a second outer surface that is positioned opposite to the second inner surface and has a third axis. The third axis is different from the second axis. The third member is provided with a third hole that is coaxial with the second outer surface and in which the second member is housed, and has a third inner surface that defines the third hole and is in contact with the second outer surface.

First Embodiment

With reference to FIG. 1 to FIG. 8, a first embodiment is described below. The present specification may describe a plurality of expressions for a component according to the embodiment and an explanation of the component. The component and the explanation thereof described by the expressions may be described by another expression that is not described. Furthermore, a component and an explanation thereof that are not described by a plurality of expressions may be described by another expression that is not described.

Figure 1:
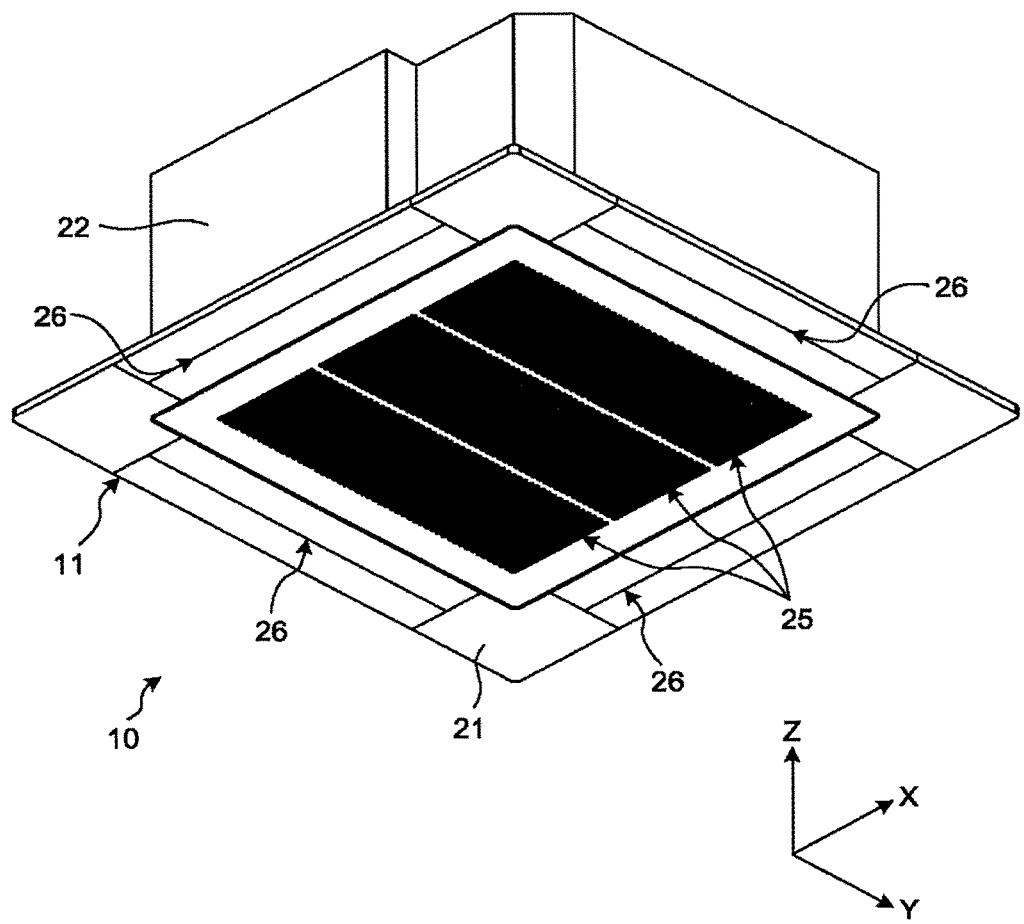
FIG. 1 is a perspective view of an air conditioning apparatus according to a first embodiment.

FIG. 1 is a perspective diagram of an air conditioning apparatus (an air conditioner, hereinafter referred to as an air conditioning device) 10 according to the first embodiment. The air conditioning device 10 is an example of an air conditioning apparatus and a rotary machine, and can also be referred to as an air conditioning unit. The rotary machine is not limited to the air conditioning device 10 and may be a mechanism having an industrial motor, a home electric appliance such as an electric fan or a washing machine, or another machine having a power source and a rotating body.

As illustrated in the drawings, an X-axis, a Y-axis, and a Z-axis are defined in the present specification. The X-axis, the Y-axis, and the Z-axis are orthogonal to each other. The X-axis is along the width of the air conditioning device 10. The Y-axis is along the length (depth) of the air conditioning device 10. The Z-axis is along the height of the air conditioning device 10.

As illustrated in FIG. 1, the air conditioning device 10 has an indoor unit 11. The indoor unit 11 is connected to an outdoor unit or a control apparatus that controls the indoor unit 11 and the outdoor unit, for example. An air conditioning system may be configured in which a plurality of indoor units 11 are connected to one control apparatus.

The indoor unit 11 has a cover 21 and a main body 22. The cover 21 is provided on an indoor ceiling on which the indoor unit 11 is installed, for example. The cover 21 includes a plurality of air intake ports 25 and a plurality of air blowing ports 26. The air blowing ports 26 are openable and closable by louvers, for example.

Figure 2:
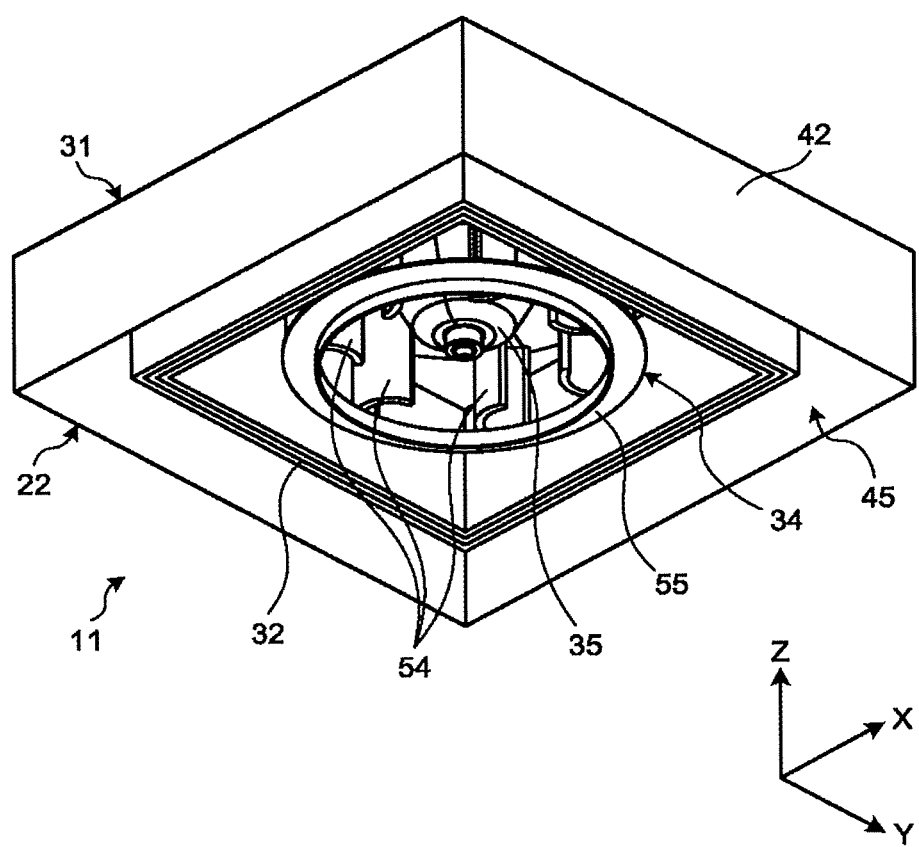
FIG. 2 is a perspective view of a main body of an indoor unit in the first embodiment.
Figure 3:
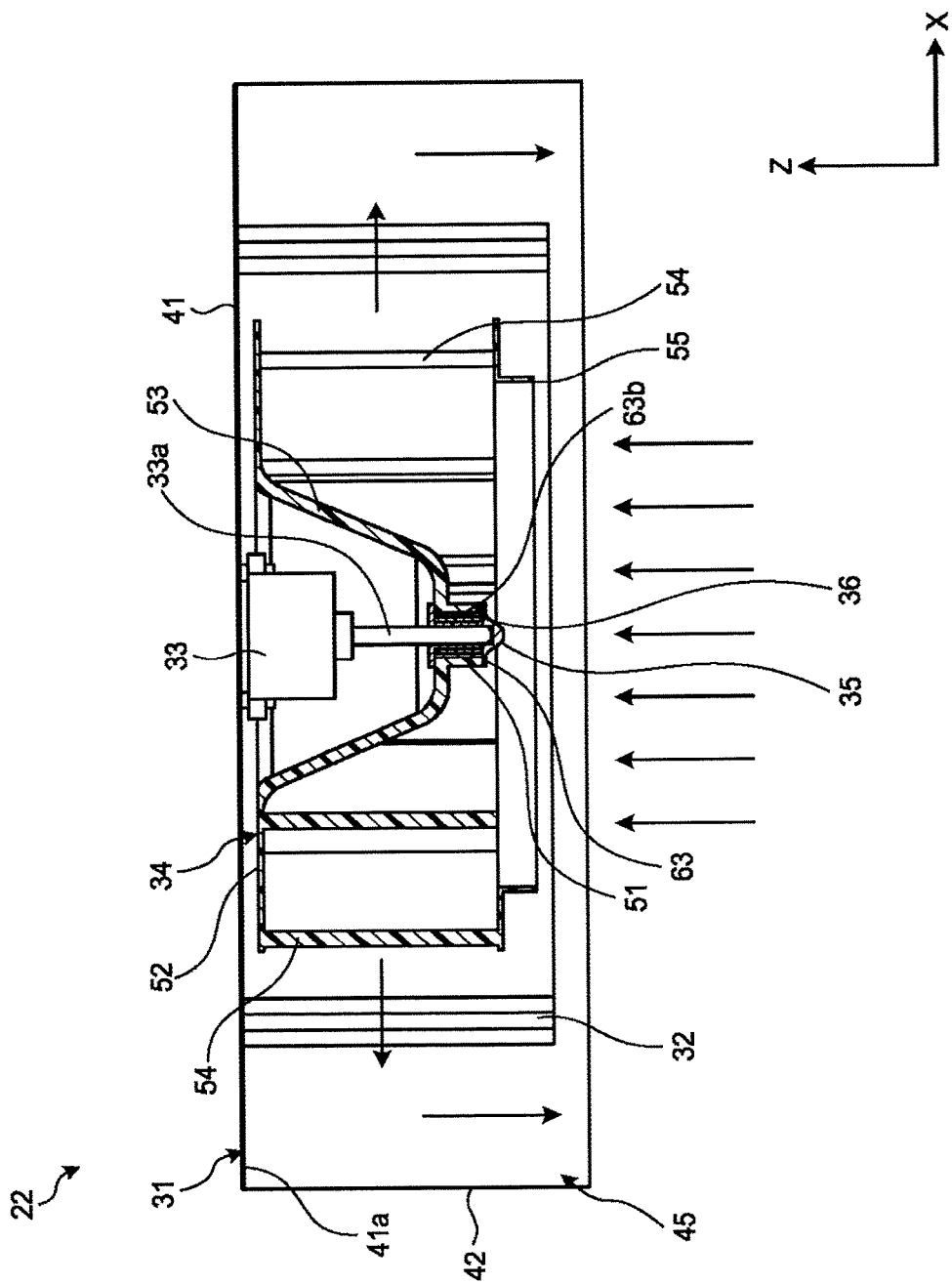
FIG. 3 is a sectional view of the main body of the indoor unit in the first embodiment.

FIG. 2 is a perspective view of the main body 22 of the indoor unit 11 in the first embodiment. FIG. 3 is a sectional view of the main body 22 of the indoor unit 11 in the first embodiment. As illustrated in FIG. 2 and FIG. 3, the main body 22 has a housing 31, a heat exchanger 32, a motor 33, a turbofan 34, a cap 35, and a bush 36. The motor 33 is an example of a power source. The turbofan 34 is an example of a rotating body and a fan and can also be referred to as a centrifugal fan, for example. The rotating body is not limited to the turbofan 34 and may be another fan such as a propeller fan or another rotating body such as a gear or a pulley, for example. The bush 36 can also be referred to as a connecting part, a bearing, or a member, for example.

As illustrated in FIG. 3, the housing 31 is formed of metal, for example, and has an upper wall 41 and a surrounding wall 42. The upper wall 41 is formed in a plate shape extending on an X-Y plane. The upper wall 41 may be formed with ribs that improve the rigidity of the upper wall 41, for example. The surrounding wall 42 is formed in a tubular shape extending in a negative direction along the Z-axis (a direction opposite to the arrow of the Z-axis or a downward direction) from the edge of the upper wall 41.

An air blowing channel 45 is provided within the housing 31. The air blowing channel 45 may be formed by the housing 31 or formed by a member mounted inside the housing 31, for example. The upper wall 41 has an inner face 41a facing the air blowing channel 45. The inner face 41a is directed in the negative direction along the Z-axis.

The heat exchanger 32 is arranged in the air blowing channel 45. The heat exchanger 32 is mounted on the inner face 41a of the upper wall 41 and is formed in a tubular shape extending in the negative direction along the Z-axis, for example. The heat exchanger 32 has pipes through which a coolant is passed, and fins, for example. The heat exchanger 32 causes heat exchange between air and the coolant passing through the heat exchanger 32 to heat or cool the air. The heat exchanger 32 is not limited to this example.

The motor 33 is a DC motor that can change its number of revolution by inverter control, for example. The motor 33 is mounted on the inner face 41a of the upper wall 41. The motor 33 is mounted on a bolt extending from the inner face 41a via a nut, for example.

The motor 33 has a shaft 33a. The shaft 33a can also be referred to as a drive shaft or a rotating shaft, for example. The shaft 33a extends in the negative direction along the Z-axis. By being driven, the motor 33 rotates the shaft 33a about the central axis of the shaft 33a.

The turbofan 34 is arranged in the air blowing channel 45 and is surrounded by the heat exchanger 32. The turbofan 34 is formed of synthetic resin, for example. The turbofan 34 may be formed of another material. The turbofan 34 has a hub 51, a support 52, a coupling part 53, a plurality of vanes 54, and a shroud 55.

The hub 51 is formed in a tubular shape extending in a direction along the Z-axis. The hub 51 is mounted on the shaft 33a of the motor 33 via the bush 36. The support 52 is formed in an annular shape extending on the X-Y plane. The support 52 is arranged at a position closer to the upper wall 41 than the hub 51 to surround the motor 33.

The coupling part 53 is formed in a substantially truncated conical tubular shape, for example, to couple an end of the hub 51 and the inner portion of the support 52. The vanes 54 are arranged in an annular shape to extend in the negative direction along the Z-axis from the support 52. The shroud 55 is formed in an annular shape extending on the X-Y plane to be connected to ends of the vanes 54.

The motor 33 rotates the shaft 33a to rotate the turbofan 34. As illustrated by the arrow in FIG. 3, the rotating turbofan 34 draws in room air from the air intake ports 25 in FIG. 1 and sends the air to the heat exchanger 32. The air heated or cooled by the heat exchanger 32 is supplied to the room from the air blowing ports 26 in FIG. 1.

The cap 35 fixes the turbofan 34 and the bush 36 to the shaft 33a of the motor 33. The cap 35 is screwed on a male screw formed at the tip of the shaft 33a to support the turbofan 34 and the bush 36, for example.

Figure 4:
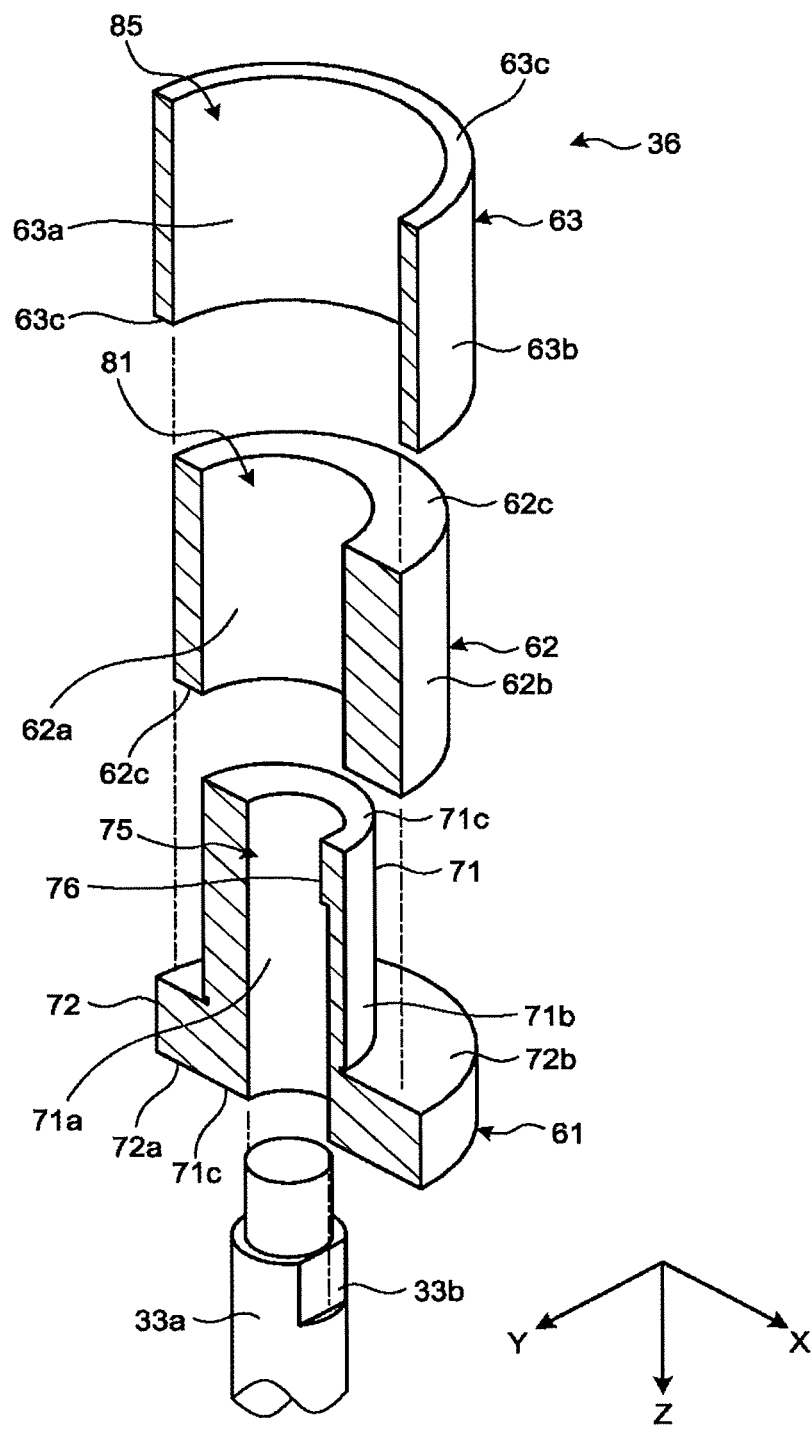
FIG. 4 is an exploded perspective view of a shaft of a motor and a bush in the first embodiment.

FIG. 4 is an exploded perspective view of the shaft 33a of the motor 33 and the bush 36 in the first embodiment. FIG. 4 illustrates a section of the bush 36. As illustrated in FIG. 4, the bush 36 has a first member 61, a second member 62, and a third member 63.

The first member 61, the second member 62, and the third member 63 are formed of relatively light metal such as an aluminum alloy, for example. In other words, the first to third members 61 to 63 are formed of the same material, in which the Young's modulus of the first member 61, the Young's modulus of the second member 62, and the Young's modulus of the third member 63 are substantially equal to each other.

The first to third members 61 to 63 may be formed of another material such as synthetic resin. The material of the first member 61, the material of the second member 62, and the material of the third member 63 may be different from each other.

The first member 61 has a tube 71 and a flange 72. The tube 71 is formed in a substantially cylindrical shape extending in the direction along the Z-axis. Consequently, the tube 71 is provided with a first hole 75 that extends in the direction along the Z-axis and passes through the tube 71. The first hole 75 can also be referred to as an opening, for example. The first hole 75 is not limited to the hole passing through the tube 71 and may be a blind hole.

Figure 5:
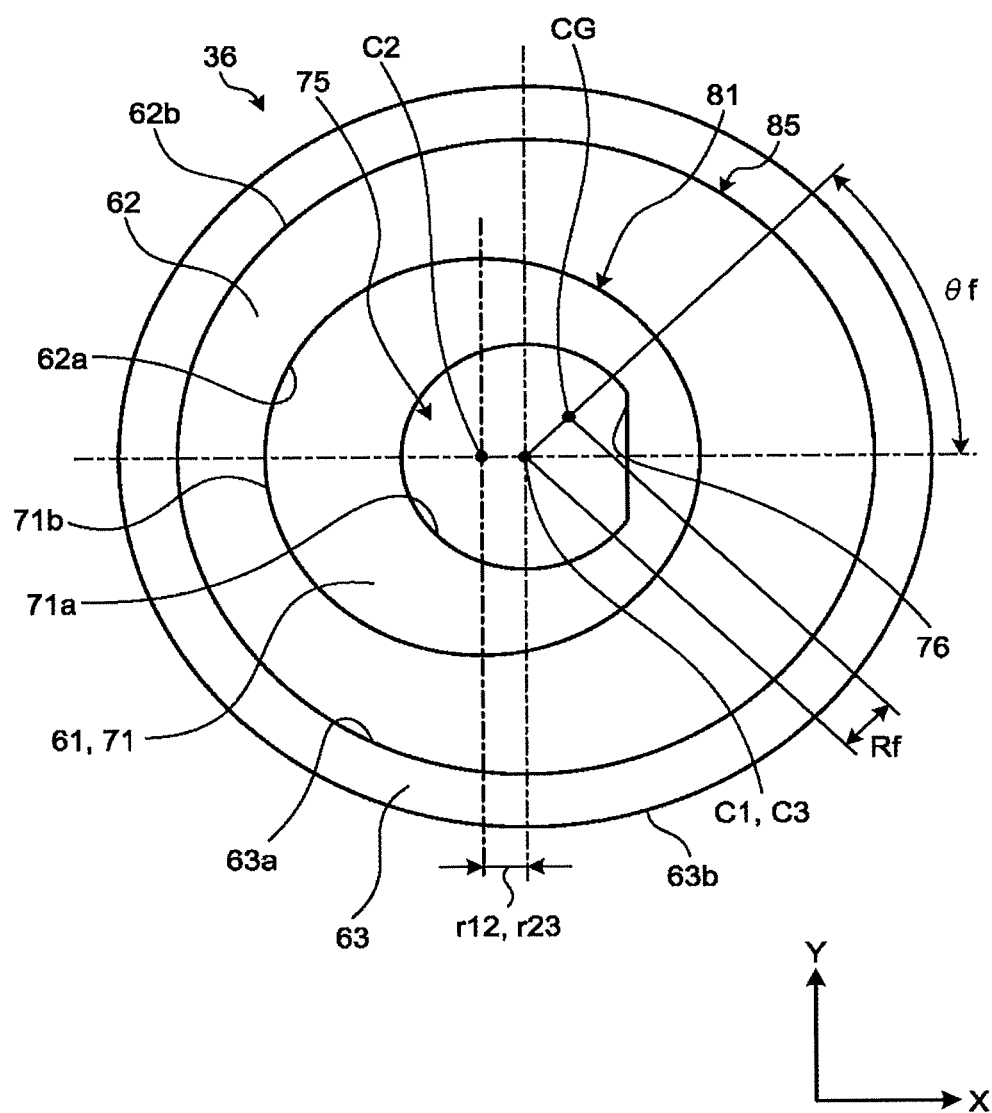
FIG. 5 is a plan view of the bush in the first embodiment.

FIG. 5 is a plan view of the bush 36 in the first embodiment. As illustrated in FIG. 5, the first hole 75 has a substantially circular section centered on a first central axis C1. The first central axis C1 is a virtual central axis of the first hole 75 along the Z-axis. In other words, the first hole 75 is a substantially circular hole extending with the first central axis C1 as a center. In other words, the first hole 75 is a hole extending with the central axis C1 placed at the center thereof. In the present embodiment, the first central axis C1 substantially coincides with the central axis of the shaft 33a of the motor 33.

As illustrated in FIG. 4, the tube 71 has a first inner surface 71a, a first outer surface 71b, and two first end faces 71c. The first inner surface 71a is a substantially cylindrical face that defines the first hole 75 and extends with the first central axis C1 as a center. In other words, the first inner surface 71a is a substantially cylindrical face extending with the first central axis C1 placed at the center thereof. The first inner surface 71a faces the first hole 75. The first hole 75 is provided inside the first inner surface 71a.

The first outer surface 71b is positioned opposite to the first inner surface 71a. As illustrated in FIG. 5, the first outer surface 71b is a substantially cylindrical face extending with a second central axis C2 as a center. In other words, the first outer surface 71b is a substantially cylindrical face extending with the second central axis C2 placed at the center thereof.

The second central axis C2 is a virtual central axis of the first outer surface 71b along the Z-axis. The second central axis C2 is parallel to the first central axis C1 and is at a position different from that of the first central axis C1. In other words, the second central axis C2 is different from the first central axis C1. In other words, the first outer surface 71b is eccentric from the first inner surface 71a and the first hole 75. The second central axis C2 may be oblique relative to the first central axis C1.

The first outer surface 71b is formed in a substantially cylindrical shape extending with the second central axis C2 as a center and is thereby formed to be rotationally symmetric about the second central axis C2. The second central axis C2 is thus also an axis of symmetry of the first outer surface 71b.

As illustrated in FIG. 4, the two first end faces 71c are directed in a positive direction along the Z-axis (a direction indicated by the arrow of the Z-axis or an upward direction)

and the negative direction along the Z-axis. The first hole 75 communicates with the two first end faces 71c.

The tube 71 includes a fitting part 76. The fitting part 76 protrudes from the first inner surface 71a inside the first hole 75. In the direction along the Z-axis, the length of the fitting part 76 is shorter than the length of the first hole 75. In other words, the fitting part 76 is provided at part of the first inner surface 71a in the direction along the Z-axis. The fitting part 76 is not limited to this example.

As in the present embodiment, a recess or a protrusion such as the fitting part 76 may be provided at part of the first inner surface 71a. In this case, the first central axis C1 passes through the center of the first hole 75 in a part having the circular section in which the recess or protrusion is not provided. The recess or protrusion may be provided across the entire area of the first inner surface 71a in the direction along the Z-axis. In this case, the first central axis C1 passes through the center of a circular arc shaped part in the section of the first hole 75. When the section of the first hole 75 includes a plurality of circular arc shaped parts, the first central axis C1 passes through the center of a circular arc shaped part the center of which is the closest to the center of gravity of the first hole 75.

Although the above describes the case in which the section of the first hole 75 has the circular or circular arc shaped part, the section of the first hole 75 may have no circular arc shaped part. In this case, the first central axis C1 passes through an axis of symmetry of the first hole 75 in a part having a rotationally symmetric section in which no recess or protrusion is provided. The recess or protrusion may be provided across the entire area of the first inner surface 71a in the direction along the Z-axis. In this case, the first central axis C1 passes through an axis of symmetry of the largest rotationally symmetric shape formed by the section of the first hole 75. When the shape of the first hole 75 does not correspond to any of the above cases, the first central axis C1 passes through the center of gravity of the section of the first hole 75.

The shaft 33a of the motor 33 is inserted into the first hole 75. The shaft 33a is what is called a D-cut shaft provided with a notch 33b. When the shaft 33a is inserted into the first hole 75, the fitting part 76 fits into the notch 33b. Therefore, the rotation of the shaft 33a is transmitted to the first member 61.

The flange 72 protrudes from the first outer surface 71b of the tube 71. The flange 72 is formed in a substantially disc shape extending on the X-Y plane. The flange 72 may be formed in another shape.

The flange 72 protrudes from the end of the first outer surface 71b in the positive direction along the Z-axis. The flange 72 has a first face 72a and a second face 72b. The first face 72a is a substantially flat face directed in the positive direction along the Z-axis. The first face 72a is continuous with one first end face 71c of the tube 71. The second face 72b is positioned opposite to the first face 72a and is a substantially flat face directed in the negative direction along the Z-axis.

The second member 62 is formed in a substantially cylindrical shape extending in the direction along the Z-axis. Consequently, the second member 62 is provided with a second hole 81 that extends in the direction along the Z-axis and passes through the second member 62. The second hole 81 can also be referred to as an opening, for example. The second hole 81 is not limited to the hole passing through the second member 62 and may be a blind hole.

As illustrated in FIG. 5, the second hole 81 has a substantially circular section centered on the second central axis C2. In other words, the second central axis C2 is a virtual central axis of the second hole 81 along the Z-axis, and the second hole 81 is a substantially circular hole extending with the second central axis C2 as a center. In other words, the second hole 81 is a hole extending with the second central axis C2 placed at the center thereof.

As illustrated in FIG. 4, the second member 62 has a second inner surface 62a, a second outer surface 62b, and two second end faces 62c. The second inner surface 62a is a substantially cylindrical face that defines the second hole 81 and extends with the second central axis C2 as a center. In other words, the second inner surface 62a is a substantially cylindrical face extending with the second central axis C2 placed at the center thereof. The second inner surface 62a faces the second hole 81. The second hole 81 is provided inside the second inner surface 62a.

The second inner surface 62a is formed in a substantially cylindrical shape extending with the second central axis C2 as a center and is thereby formed to be rotationally symmetric about the second central axis C2. The second central axis C2 is thus also an axis of symmetry of the second inner surface 62a.

As described above, the center of the second hole 81 and the second inner surface 62a (the second central axis C2) and the center of the first outer surface 71b of the tube 71 of the first member 61 (the second central axis C2) substantially coincide with each other. Consequently, when the first member 61 and the second member 62 are not fixed to each other to be free, the second member 62 can rotate about the second central axis C2 relative to the first member 61.

The tube 71 of the first member 61 is housed in the second hole 81. The radius of the second hole 81 and the radius of the first outer surface 71b of the tube 71 of the first member 61 are substantially equal to each other. Consequently, the second inner surface 62a is in contact with the first outer surface 71b to inhibit the second member 62 from moving in a direction crossing the Z-axis relative to the first member 61. Part of the second inner surface 62a may be slightly separate from the first outer surface 71b.

The second outer surface 62b is positioned opposite to the second inner surface 62a. As illustrated in FIG. 5, the second outer surface 62b is a cylindrical face extending with a third central axis C3 as a center. In other words, the second outer surface 62b is a cylindrical face extending with the third central axis C3 placed at the center thereof.

The third central axis C3 is a virtual central axis of the second outer surface 62b along the Z-axis. The third central axis C3 is parallel to the first central axis C1, is parallel to the second central axis C2, and is at a position different from the second central axis C2. In other words, the third central axis C3 is different from the second central axis C2. In other words, the second outer surface 62b and the second inner surface 62a and the second hole 81 are eccentric from each other. The third central axis C3 may be oblique relative to the first central axis C1 or oblique relative to the second central axis C2.

A distance r12 between the first central axis C1 and the second central axis C2 is substantially equal to a distance r23 between the second central axis C2 and the third central axis C3. Consequently, as in FIG. 5, the first central axis C1 and the third central axis C3 can be arranged at the same position.

The second outer surface 62b is formed in a cylindrical shape extending with the third central axis C3 as a center and is thereby formed to be rotationally symmetric about the third central axis C3. The third central axis C3 is thus also an axis of symmetry of the second outer surface 62b.

As illustrated in FIG. 4, the two second end faces 62c are directed in the positive direction along the Z-axis and the negative direction along the Z-axis. The second hole 81 communicates with the two second end faces 62c. The tube 71 is housed in the second hole 81, whereby the second end face 62c directed in the positive direction along the Z-axis is in contact with the second face 72b of the flange 72. The flange 72 supports the second member 62 to inhibit the second member 62 from moving in the positive direction along the Z-axis relative to the first member 61.

The third member 63 is formed in a substantially cylindrical shape extending in the direction along the Z-axis. Consequently, the third member 63 is provided with a third hole 85 that extends in the direction along the Z-axis and passes through the third member 63. The third hole 85 can also be referred to as an opening, for example. The third hole 85 is not limited to the hole passing through the third member 63 and may be a blind hole.

As illustrated in FIG. 5, the third hole 85 has a substantially circular section centered on the third central axis C3. In other words, the third central axis C3 is a virtual central axis of the third hole 85 along the Z-axis, and the third hole 85 is a substantially circular hole extending with the third central axis C3 as a center. In other words, the third hole 85 is a hole extending with the third central axis C3 placed at the center thereof.

As illustrated in FIG. 4, the third member 63 has a third inner surface 63a, a third outer surface 63b, and two third end faces 63c. The third inner surface 63a is a substantially cylindrical face that defines the third hole 85 and extends with the third central axis C3 as a center. In other words, the third inner surface 63a is a substantially cylindrical face extending with the third central axis C3 placed at the center thereof. The third inner surface 63a faces the third hole 85. The third hole 85 is provided inside the third inner surface 63a. In other words, the third inner surface 63a is eccentric from the second inner surface 62a and the second hole 81.

The third inner surface 63a is formed in a substantially cylindrical shape extending with the third central axis C3 as a center and is thereby formed to be rotationally symmetric about the third central axis C3. The third central axis C3 is thus also an axis of symmetry of the third inner surface 63a.

As described above, the center of the third hole 85 and the third inner surface 63a (the third central axis C3) and the center of the second outer surface 62b of the second member 62 (the third central axis C3) substantially coincide with each other. Consequently, when the second member 62 and the third member 63 are not fixed to each other to be free, the third member 63 can rotate about the third central axis C3 relative to the second member 62.

The second member 62 is housed in the third hole 85. The radius of the third hole 85 and the radius of the second outer surface 62b of the second member 62 are substantially equal to each other. Consequently, the third inner surface 63a is in contact with the second outer surface 62b to inhibit the third member 63 from moving in a direction crossing the Z-axis relative to the second member 62. Part of the third inner surface 63a may be slightly separate from the second outer surface 62b.

The third outer surface 63b is positioned opposite to the third inner surface 63a. As illustrated in FIG. 5, the third outer surface 63b is a cylindrical face extending with the third central axis C3 as a center. In other words, the center of the third outer surface 63b (the third central axis C3) and the center of the third inner surface 63a (the third central axis C3) substantially coincide with each other. In other words, the third inner surface 63a and the third outer surface 63b are concentrically arranged.

The third outer surface 63b is a substantially cylindrical face extending with the third central axis C3 as a center. The third outer surface 63b is formed to be rotationally symmetric about the third central axis C3. The third central axis C3 is thus also an axis of symmetry of the third outer surface 63b.

As illustrated in FIG. 3, the third member 63 is formed integrally with the hub 51 of the turbofan 34 by insert molding, for example. In the present embodiment, the third outer surface 63b of the third member 63 is connected to the hub 51 of the turbofan 34. The third member 63 and the turbofan 34 are not limited to this example and may be formed as one component of the same material, for example.

As illustrated in FIG. 4, the two third end faces 63c are directed in the positive direction along the Z-axis and the negative direction along the Z-axis. The third hole 85 communicates with the two third end faces 63c. The tube 71 is housed in the second hole 81, and the second member 62 is housed in the third hole 85, whereby the third end face 63c directed in the positive direction along the Z-axis is in contact with the second face 72b of the flange 72. The flange 72 supports the third member 63 to inhibit the third member 63 from moving in the positive direction along the Z-axis relative to the first member 61.

With the tube 71 housed in the second hole 81 and the second member 62 housed in the third hole 85, the first end face 71c, the second end face 62c, and the third end face 63c directed in the negative direction along the Z-axis form substantially the same plane. The cap 35 mounted on the shaft 33a supports the first end face 71c, the second end face 62c, and the third end face 63c directed in the negative direction along the Z-axis to inhibit the second and third members 62 and 63 from moving in the negative direction along the Z-axis relative to the first member 61.

The first to third members 61 to 63 described above are assembled in accordance with the position of the center of gravity of the turbofan 34 integrally formed with the third member 63. Specifically, the first to third members 61 to 63 are rotated about the center (the second central axis C2 or the third central axis C3) with each other to be arranged so as to make the position of the central axis of the shaft 33a of the motor 33 and the position of the center of gravity of the turbofan 34 coincide with each other. In other words, the position of the first central axis C1 and the position of the center of gravity of the turbofan 34 are made to coincide with each other.

The position of the center of gravity of the turbofan 34 is measured by mounting the turbofan 34 on three pressure sensors arranged in a triangular shape. The position of the center of gravity of the turbofan 34 is not limited to this example and may be measured by rotating the turbofan 34, for example.

With the position of the first central axis C1 and the position of the center of gravity of the turbofan 34 coinciding with each other, the first to third members 61 to 63 are fixed to each other by welding or gluing, for example. Therefore, the shaft 33a of the motor 33 becomes able to transmit rotation (torque) to the turbofan 34 via the first to third members 61 to 63. The first to third members 61 to 63 may be fixed to each other by other means.

The center of gravity of the turbofan 34 may be at any position on the first central axis C1 along the Z-axis. In other words, the position of the center of gravity of the turbofan 34 is made to coincide with the position of the first central axis C1 in a plan view in a direction in which the first central axis C1 extends (the positive direction along the Z-axis or the negative direction along the Z-axis).

By making the position of the first central axis C1 and the position of the center of gravity of the turbofan 34 coincide with each other, the occurrence of vibration in the rotating turbofan 34 is lessened. Even when the position of the first central axis C1 and the position of the center of gravity of the turbofan 34 are different from each other, by making the position of the first central axis C1 closer to the position of the center of gravity of the turbofan 34, the vibration occurring in the rotating turbofan 34 is reduced.

When the position of the center of gravity of the turbofan 34 is the same as the position of the third central axis C3 that is the center of the turbofan 34 and the third member 63, for example, the first to third members 61 to 63 are arranged as illustrated in FIG. 5. In other words, the first central axis C1 and the third central axis C3 are arranged at the same position. In this case, the position of the second central axis C2 may be different from the position illustrated in FIG. 5.

The first to third members 61 to 63 are arranged as in FIG. 5, whereby the position of the central axis of the shaft 33a of the motor 33 and the position of the center of gravity of the turbofan 34 (the central axis C3) substantially coincide with each other. Therefore, the occurrence of vibration in the rotating turbofan 34 is lessened.

In contrast, owing to the position aberration of the third member 63 during insert molding, for example, the position of the center of gravity of the turbofan 34 may be different from the position of the central axis C3. In this case, the first to third members 61 to 63 are rotated about the center (the second central axis C2 or the third central axis C3) with each other from the position in FIG. 5. The following describes position matching between a center of gravity CG at a position different from the third central axis C3 as illustrated in FIG. 5 and the first central axis C1. Although the description is based on the positions illustrated in FIG. 5 for the convenience of description, the position matching between the center of gravity CG and the first central axis C1 is not limited to this example.

The center of gravity CG is at a position represented by polar coordinates (Rf, θf) based on the third central axis C3. In other words, the center of gravity CG is at a position that is separated from the third central axis C3 by a distance of Rf and is rotated from the position illustrated in FIG. 5 by an angle of θf about the third central axis C3.

Figure 6:
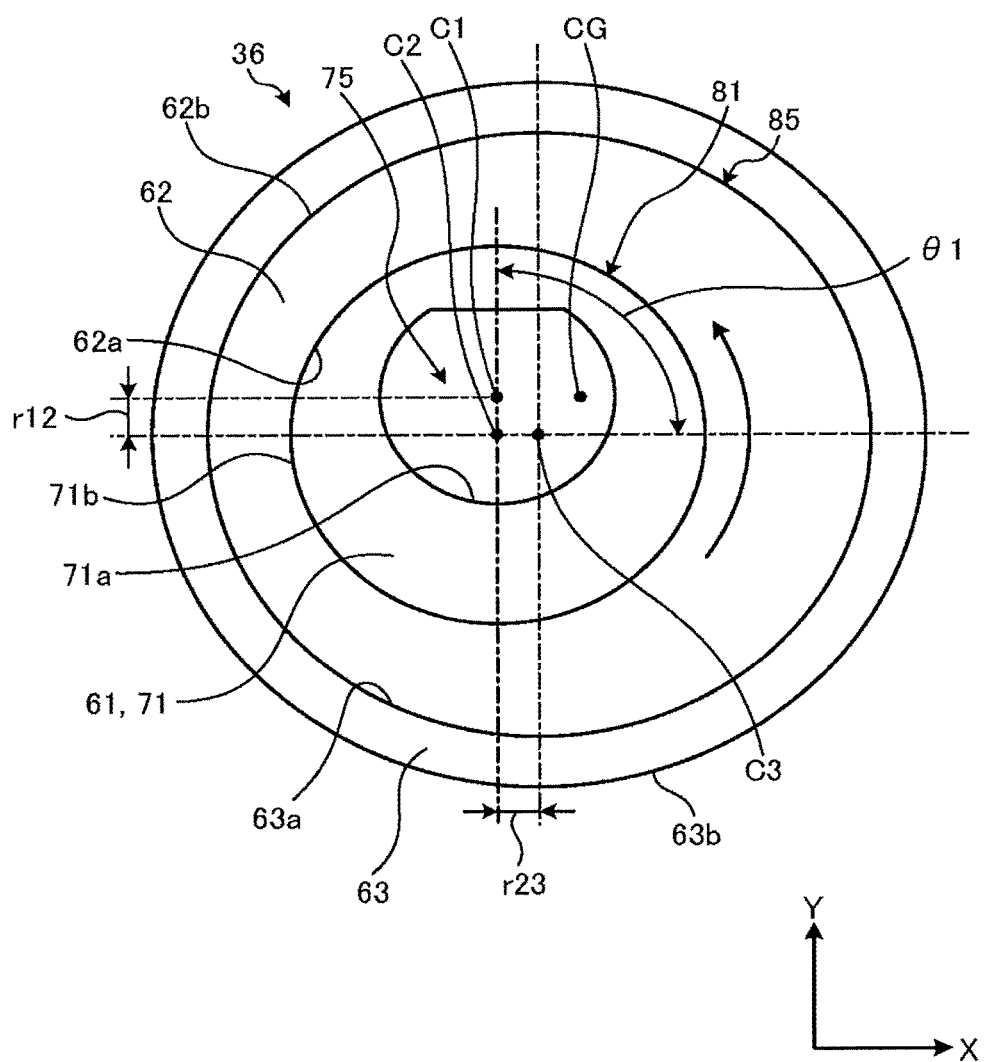
FIG. 6 is a plan view of the bush in which a first member is rotated in the first embodiment.

FIG. 6 is a plan view of the bush 36 in which the first member 61 is rotated in the first embodiment. As illustrated in FIG. 6, the first member 61 is rotated about the second central axis C2 by an angle of θ1 relative to the second member 62. Therefore, the distance between the first central axis C1 and the third central axis C3 changes, whereby the first central axis C1 is arranged at a position separate from the third central axis C3 by the distance Rf. In other words, the first member 61 rotates about the second central axis C2 relative to the second member 62, whereby the amount of eccentricity of the first central axis C1 relative to the third central axis C3 is adjusted.

Figure 7:
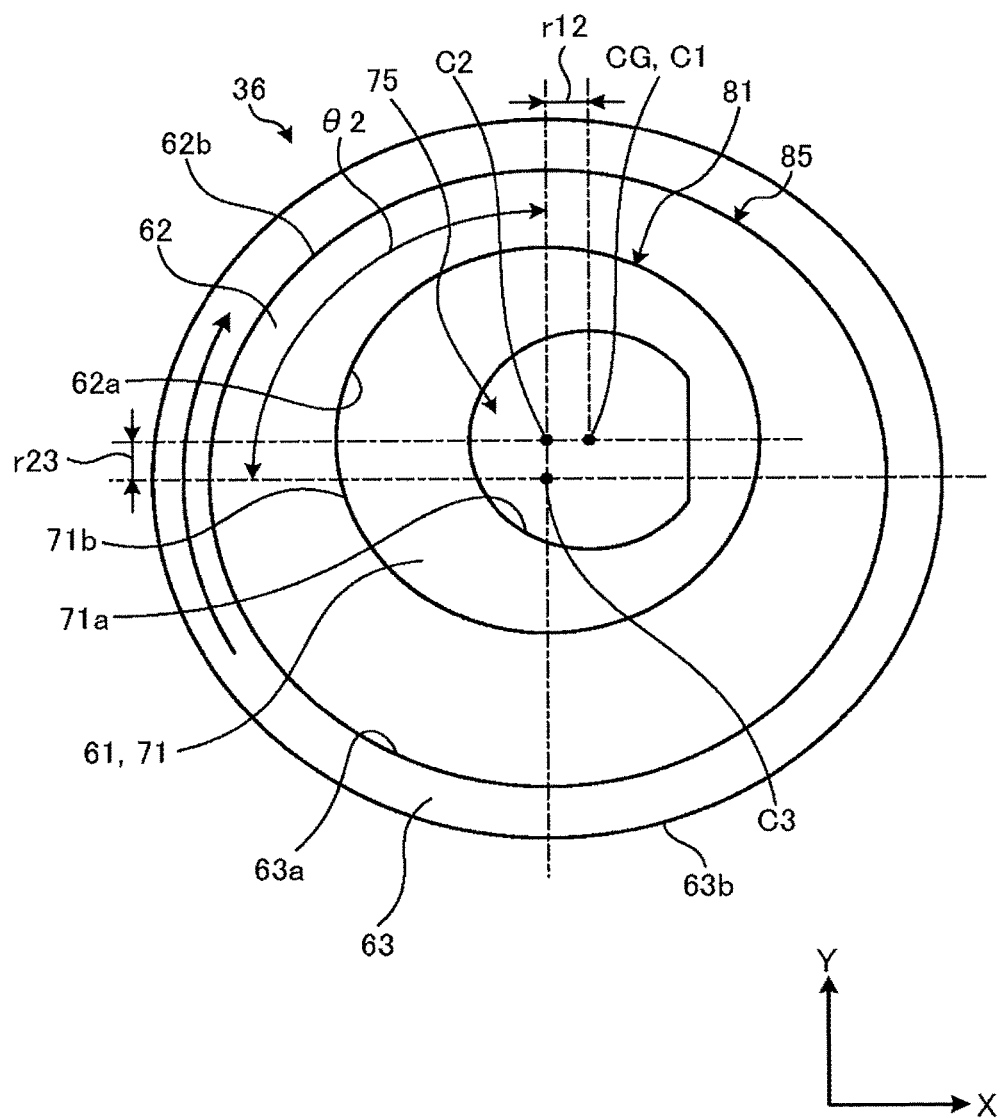
FIG. 7 is a plan view of the bush in which a second member is rotated in the first embodiment.

FIG. 7 is a plan view of the bush 36 in which the second member 62 is rotated in the first embodiment. Next, the second member 62 is rotated about the third central axis C3 by an angle of θ2 relative to the third member 63. Therefore, the angle of the first central axis C1 with reference to the third central axis C3 changes, whereby the first central axis C1 is arranged at the polar coordinates (Rf, θf) and is arranged at the same position as the center of gravity CG. In other words, the second member 62 rotates about the third central axis C3 relative to the third member 63, whereby the angle of the first central axis C1 with respect to the third central axis C3 is adjusted.

The rotation angle θ1 of the first member 61 for arranging the first central axis C1 at the polar coordinates (Rf, θf) is determined by the following Formula 1:

$$\theta 1 = \cos^{-1}\left\{1 - \frac{1}{2}\left(\frac{Rf}{r12}\right)^2\right\} \quad \text{(Formula 1)}$$

The rotation angle θ2 of the second member 62 for arranging the first central axis C1 at the polar coordinates (Rf, θf) is determined by the following Formula 2:

$$\theta 2 = \theta f + \tan^{-1}\left\{\frac{\sin\theta 1}{1 - \cos\theta 1}\right\} - \pi \quad \text{(Formula 2)}$$

The first and second members 61 and 62 are rotated as described above, whereby the position of the central axis of the shaft 33a of the motor 33 and the position of the center of gravity CG of the turbofan 34 substantially coincide with each other. In this case, although the turbofan 34 and the shaft 33a of the motor 33 are eccentric from each other in outward appearance, the occurrence of vibration in the rotating turbofan 34 is lessened.

Figure 8:
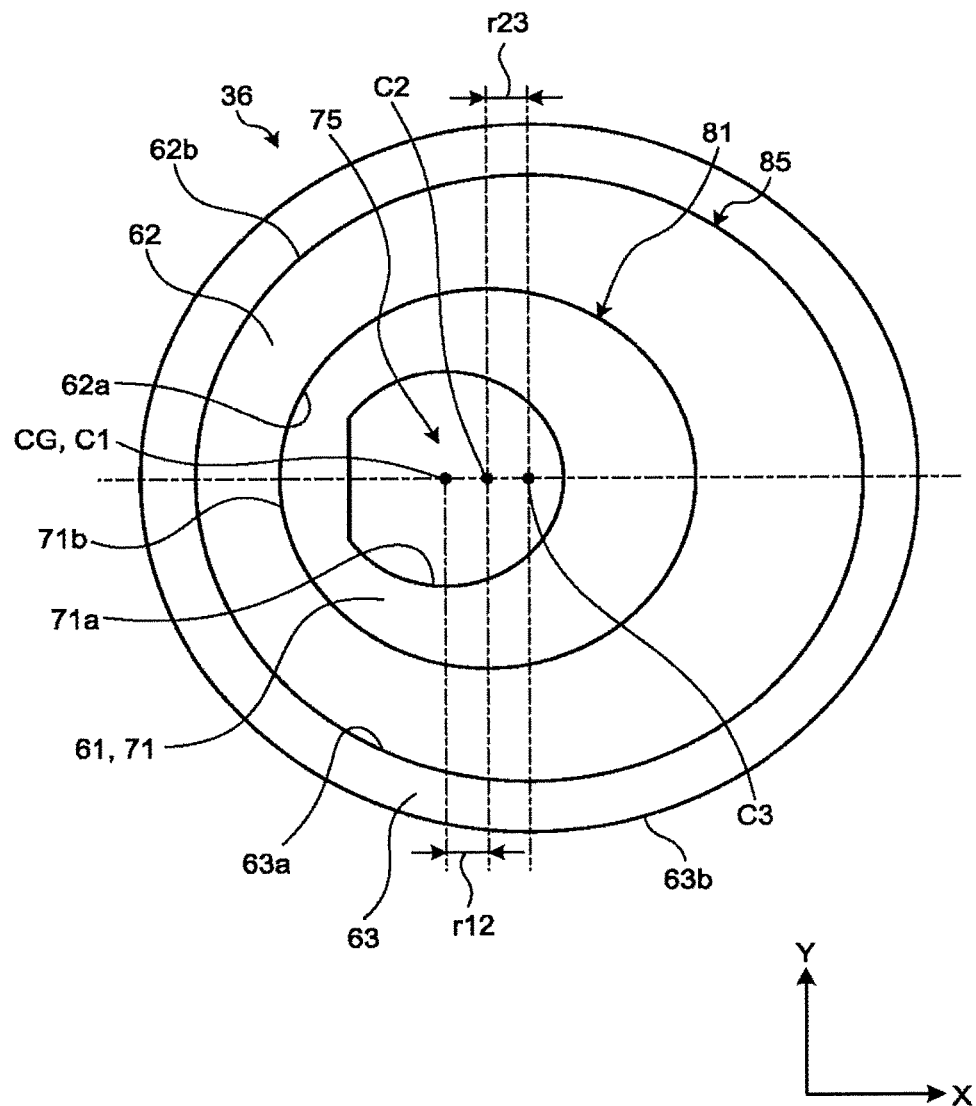
FIG. 8 is a plan view of another example of the bush in the first embodiment.

FIG. 8 is a plan view of another example of the bush 36 in the first embodiment. In the case illustrated in FIG. 8, the distance Rf between the center of gravity CG and the third central axis C3 is set to the maximum value that can arrange the first central axis C1 and the center of gravity CG at the same position by the bush 36. The first member 61 is rotated by 180 degrees relative to the second member 62, whereby the first central axis C1 is arranged at the same position as the center of gravity CG in the case illustrated in FIG. 8.

In the case illustrated in FIG. 8, the distance Rf is shown by the following Formula 3:

$$Rf = r12 + r23 = 2 \times r12 = 2 \times r23 \quad \text{(Formula 3)}$$

From Formula (3), when the distance Rf is equal to or shorter than the sum of the distance r12 and the distance r23, the bush 36 can arrange the first central axis C1 and the center of gravity CG at the same position.

As described above, the second member 62 is rotated about the second central axis C2 relative to the first member 61 in accordance with the position of the center of gravity of the turbofan 34 and fixed to the first member 61. In other words, the second member 62 can be mounted on the first member 61 with a plurality of angles about the second central axis C2 relative to the first member 61.

Furthermore, the third member 63 is rotated about the third central axis C3 relative to the second member 62 in accordance with the position of the center of gravity of the turbofan 34 and fixed to the second member 62. In other words, the third member 63 can be mounted on the second member 62 with a plurality of angles about the third central axis C3 relative to the second member 62. Therefore, the position of the central axis of the shaft 33a of the motor 33 and the position of the center of gravity of the turbofan 34 can be made to coincide with each other.

In the air conditioning device 10 according to the first embodiment described above, the first central axis C1 of the first inner surface 71a of the first member 61 is different from the second central axis C2 of the first outer surface 71b. Furthermore, the second central axis C2 of the second inner surface 62a of the second member 62 is different from the third central axis C3 of the second outer surface 62b. The first member 61 is housed in the second hole 81 of the second member 62, and the second member 62 is housed in the third hole 85 of the third member 63. The second member 62 is mounted on the first member 61 with a desired angle about the second central axis C2 relative to the first member 61, and the third member 63 is mounted on the second member 62 with a desired angle about the third central axis C3 relative to the second member 62, for example, whereby the position of the third central axis C3 can be arranged at a desired position that coincides with the first central axis C1 or is different from the first central axis C1. Therefore, the position of the first central axis C1 can be made to coincide with the position of the center of gravity CG of the rotating body such as the turbofan 34 on which the bush 36 is mounted, for example, thus reducing the vibration of the turbofan 34. Consequently, the occurrence of noise caused by vibration is lessened. In addition, gravity center adjustment work by mounting a weight (a balancer) is eliminated, and a complicated reinforcing structure for reducing vibration is eliminated, thereby reducing the manufacturing costs of a rotary machine such as the air conditioning device 10 having the bush 36.

The second member 62 can be mounted on the first member 61 with a plurality of angles about the second central axis C2 relative to the first member 61. The third member 63 can be mounted on the second member 62 with a plurality of angles about the third central axis C3 relative to the second member 62. The second member 62 is mounted on the first member 61 with a desired angle about the second central axis C2 relative to the first member 61, and the third member 63 is mounted on the second member 62 with a desired angle about the third central axis C3 relative to the second member 62, whereby the position of the first central axis C1 can be made to coincide with the position of the center of gravity of the rotating body such as the turbofan 34 on which the bush 36 is mounted, for example, thus reducing the vibration of the turbofan 34.

The first to third central axes C1 to C3 are parallel to each other. Therefore, on the X-Y plane orthogonal to the first to third central axes C1 to C3, the position of the third central axis C3 relative to the first central axis C1 can be arranged easily at a desired position.

The distance r12 between the first central axis C1 and the second central axis C2 is equal to the distance r23 between the second central axis C2 and the third central axis C3. Therefore, the position of the first central axis C1 can be arranged at a position coinciding with the third central axis C3.

The first outer surface 71b and the second inner surface 62a are formed to be rotationally symmetric about the second central axis C2. The second outer surface 62b and the third inner surface 63a are formed to be rotationally symmetric about the third central axis C3. Therefore, the second member 62 can be easily mounted on the first member 61 with a plurality of angles about the second central axis C2 relative to the first member 61. Furthermore, the third member 63 can be easily mounted on the second member 62 with a plurality of angles about the third central axis C3 relative to the second member 62. Consequently, the position of the first central axis C1 can be made to coincide with the position of the center of gravity CG of the rotating body such as the turbofan 34 on which the bush 36 is mounted, for example, thus reducing the vibration of the turbofan 34.

Second Embodiment

Figure 9:
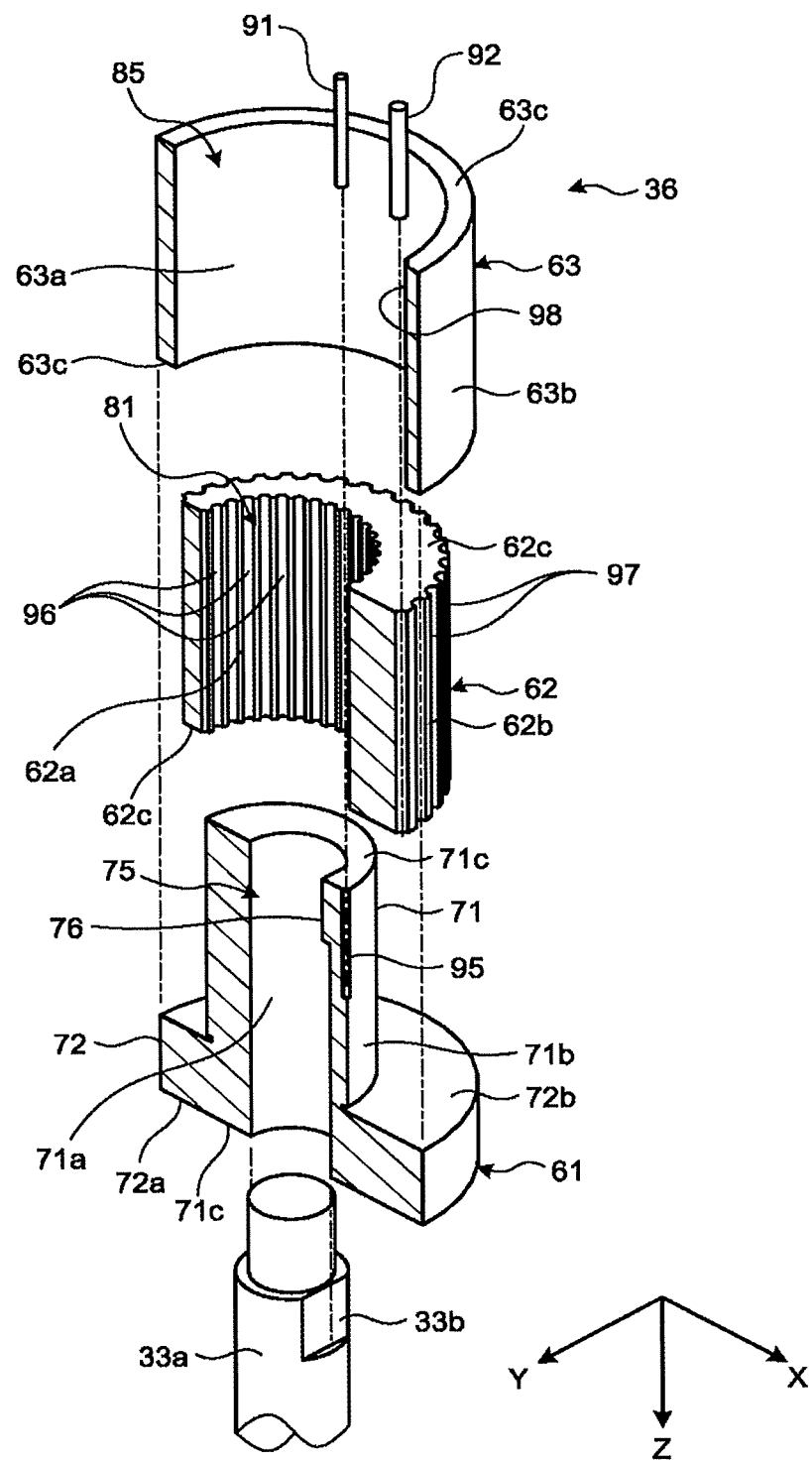
FIG. 9 is an exploded perspective view of the shaft of the motor and the bush according to a second embodiment.
Figure 10:
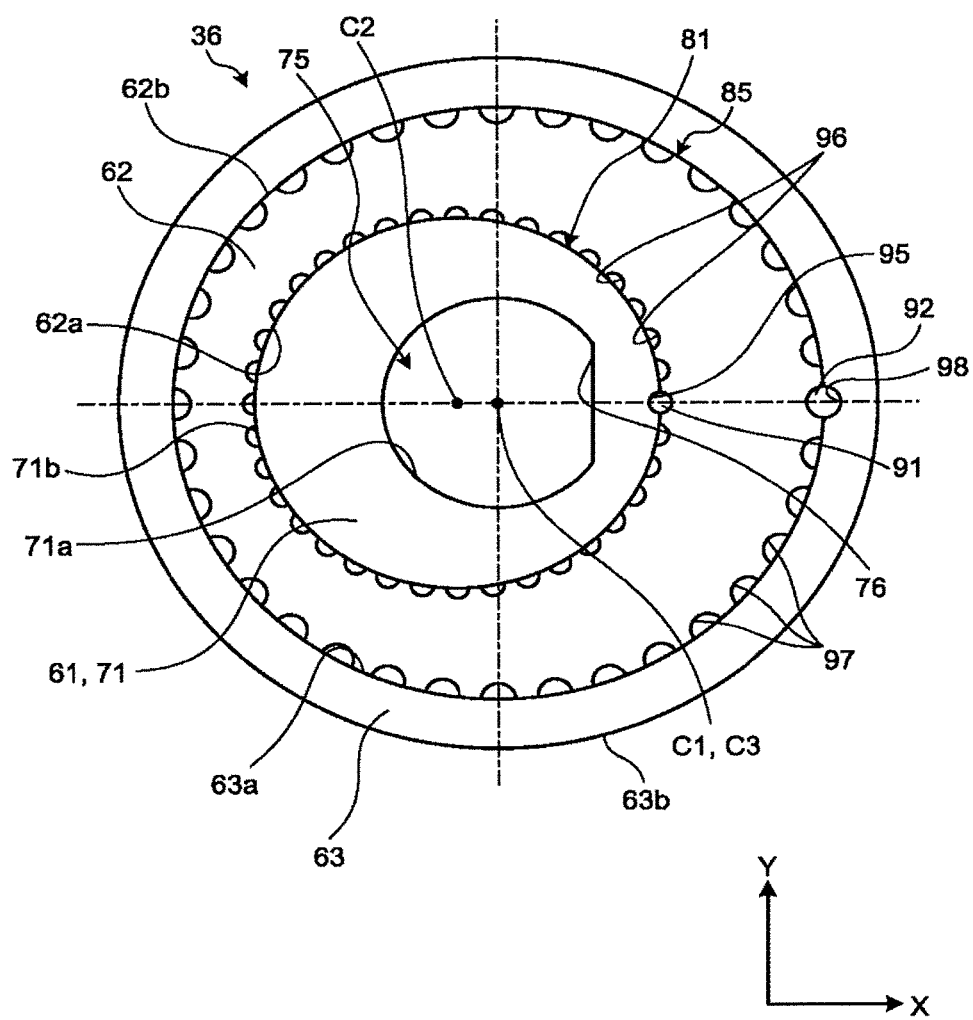
FIG. 10 is a plan view of the bush in the second embodiment.

With reference to FIG. 9 and FIG. 10, a second embodiment is described below. In the description of the following embodiments, components having functions similar to those of the components already described are denoted by the same symbols as those of the components already described, and description thereof may be omitted. A plurality of components denoted by the same symbol do not necessarily share all of their functions and properties and may have different functions and properties depending on the respective embodiments.

FIG. 9 is an exploded perspective view of the shaft 33a of the motor 33 and the bush 36 according to the second embodiment. As illustrated in FIG. 9, the bush 36 in the second embodiment further has a first pin 91 and a second pin 92. The first pin 91 is an example of a first stopper. The second pin 92 is an example of a second stopper. The first and second stoppers are not limited to the first and second pins 91 and 92 and may be other members such as balls.

The first pin 91 and the second pin 92 are formed of metal such as an aluminum alloy, for example. The first and second pins 91 and 92 may be formed of another material. The first pin 91 and the second pin 92 are each formed in a cylindrical shape extending in the direction along the Z-axis. The radius of the second pin 92 is longer than the radius of the first pin 91. The radii of the first and second pins 91 and 92 are not limited to this example.

FIG. 10 is a plan view of the bush 36 in the second embodiment. As illustrated in FIG. 10, the first outer surface 71b is provided with a first groove 95. The first groove 95 is a recess that extends in the direction along the Z-axis and has a substantially semicircular section that is convex toward the second central axis C2. In other words, the first groove 95 extends parallel to the second central axis C2. The end of the first groove 95 in the negative direction along the Z-axis communicates with the first end face 71c in the negative direction along the Z-axis.

The second inner surface 62a is provided with a plurality of second grooves 96. The second grooves 96 are each a recess that extends in the direction along the Z-axis and has a substantially semicircular section that is convex in a direction radially departing from the second central axis C2. In other words, the second grooves 96 extend parallel to the second central axis C2. The ends of the second grooves 96 in the positive direction along the Z-axis and the negative direction along the Z-axis communicate with the second end faces 62c in the positive direction along the Z-axis and the negative direction along the Z-axis.

Recesses such as the second grooves 96 or protrusions may be provided at part of the second inner surface 62a. In this case, the second central axis C2 passes through the center of the second hole 81 in a part having the circular section in which the recesses or protrusions are not provided. The recesses or protrusions may be provided across the entire area of the second inner surface 62a in the direction along the Z-axis. In this case, the second central axis C2 passes through the center of a circular arc shaped part in the section of the second hole 81. Furthermore, as in the present embodiment, when the section of the second hole 81 includes a plurality of circular arc shaped parts (the second inner surface 62a and the second grooves 96), the second central axis C2 passes through the center of a circular arc shaped part the center of which is the closest to the center of gravity of the second hole 81 (the second inner surface 62a).

Although the above describes the case in which the section of the second hole 81 has the circular or circular arc shaped part, the section of the second hole 81 may have no circular arc shaped part. In this case, the second central axis C2 passes through an axis of symmetry of the second hole 81 in a part having a rotationally symmetric section in which no recess or protrusion is provided. The recesses or protrusions may be provided across the entire area of the second inner surface 62a in the direction along the Z-axis. In this case, the second central axis C2 passes through an axis of symmetry of the largest rotationally symmetric shape formed by the section of the second hole 81. When the shape of the second hole 81 does not correspond to any of the above cases, the second central axis C2 passes through the center of gravity of the section of the second hole 81.

The second grooves 96 are arranged at regular intervals around the second central axis C2. The radius of each of the second grooves 96 is substantially equal to the radius of the first groove 95. Furthermore, the radius of the first groove 95 and the radius of each of the second grooves 96 are substantially equal to the radius of the first pin 91.

The second outer surface 62b is provided with a plurality of third grooves 97. The third grooves 97 are each a recess that extends in the direction along the Z-axis and has a semicircular section that is convex toward the third central axis C3. In other words, the third grooves 97 extend parallel to the third central axis C3. The ends of the third grooves 97 in the positive direction along the Z-axis and the negative direction along the Z-axis communicate with the second end faces 62c in the positive direction along the Z-axis and the negative direction along the Z-axis. The third grooves 97 are arranged at regular intervals around the third central axis C3.

The third inner surface 63a includes a fourth groove 98. The fourth groove 98 is a recess that extends in the direction along the Z-axis and has a substantially semicircular section that is convex in a direction departing from the third central axis C3. In other words, the fourth groove 98 extends parallel to the third central axis C3. The ends of the fourth groove 98 in the positive direction along the Z-axis and the negative direction along the Z-axis communicate with the third end faces 63c in the positive direction along the Z-axis and the negative direction along the Z-axis.

A recess such as the fourth groove 98 or a protrusion may be provided at part of the third inner surface 63a. In this case, the third central axis C3 passes through the center of the third hole 85 in a part having the circular section in which the recess or protrusion is not provided. The recess or protrusion may be provided across the entire area of the third inner surface 63a in the direction along the Z-axis. In this case, the third central axis C3 passes through the center of a circular arc shaped part in the section of the third hole 85. When the section of the third hole 85 includes a plurality of circular arc shaped parts (the third inner surface 63a and the fourth groove 98), the third central axis C3 passes through the center of a circular arc shaped part the center of which is the closest to the center of gravity of the third hole 85 (the third inner surface 63a).

Although the above describes the case in which the section of the third hole 85 has the circular or circular arc shaped part, the section of the third hole 85 may have no circular arc shaped part. In this case, the third central axis C3 passes through an axis of symmetry of the third hole 85 in a part having a rotationally symmetric section in which no recess or protrusion is provided. The recess or protrusion may be provided across the entire area of the third inner surface 63a in the direction along the Z-axis. In this case, the third central axis C3 passes through an axis of symmetry of the largest rotationally symmetric shape formed by the section of the third hole 85. When the shape of the third hole 85 does not correspond to any of the above cases, the third central axis C3 passes through the center of gravity of the section of the third hole 85.

The radius of the fourth groove 98 is substantially equal to the radius of each of the third grooves 97. Furthermore, the radius of each of the third grooves 97 and the radius of the fourth groove 98 are substantially equal to the radius of the second pin 92.

The first groove 95 and one of the second grooves 96 face each other, thereby forming a substantially circular hole that communicates with the first and second end faces 71c and 62c directed in the negative direction along the Z-axis. The first pin 91 is fit into the first and second grooves 95 and 96 that form the hole. The first pin 91 is fit into the first groove 95 and the second groove 96 facing each other, thereby inhibiting the first member 61 housed in the second hole 81 from rotating about the second central axis C2 relative to the second member 62.

One of the third grooves 97 and the fourth groove 98 face each other, thereby forming a substantially circular hole that communicates with the second and third end faces 62c and 63c directed in the negative direction along the Z-axis. The second pin 92 is fit into the third and fourth grooves 97 and 98 that form the hole. The second pin 92 is fit into the third groove 97 and the fourth groove 98 facing each other, thereby inhibiting the second member 62 housed in the third hole 85 from rotating about the third central axis C3 relative to the third member 63.

In the air conditioning device 10 according to the second embodiment described above, the first pin 91 is fit into the first groove 95 on the first outer surface 71b and the second groove 96 on the second inner surface 62a facing each other, thereby inhibiting the first member 61 housed in the second hole 81 from rotating about the second central axis C2 relative to the second member 62. The second pin 92 is fit into the third groove 97 on the second outer surface 62b and the fourth groove 98 on the third inner surface 63a facing each other, thereby inhibiting the second member 62 housed in the third hole 85 from rotating about the third central axis C3 relative to the third member 63. Therefore, relative rotation among the first to third members 61 to 63 can be easily inhibited without welding or gluing. Furthermore, the first to fourth grooves 95 to 98 can be easily formed by extrusion molding, for example.

In the second embodiment, the second member 62 is provided with the second grooves 96 and the third grooves 97; however, the first member 61 may be provided with a plurality of first grooves 95, and the third member 63 may be provided with a plurality of fourth grooves 98.

Third Embodiment

Figure 11:
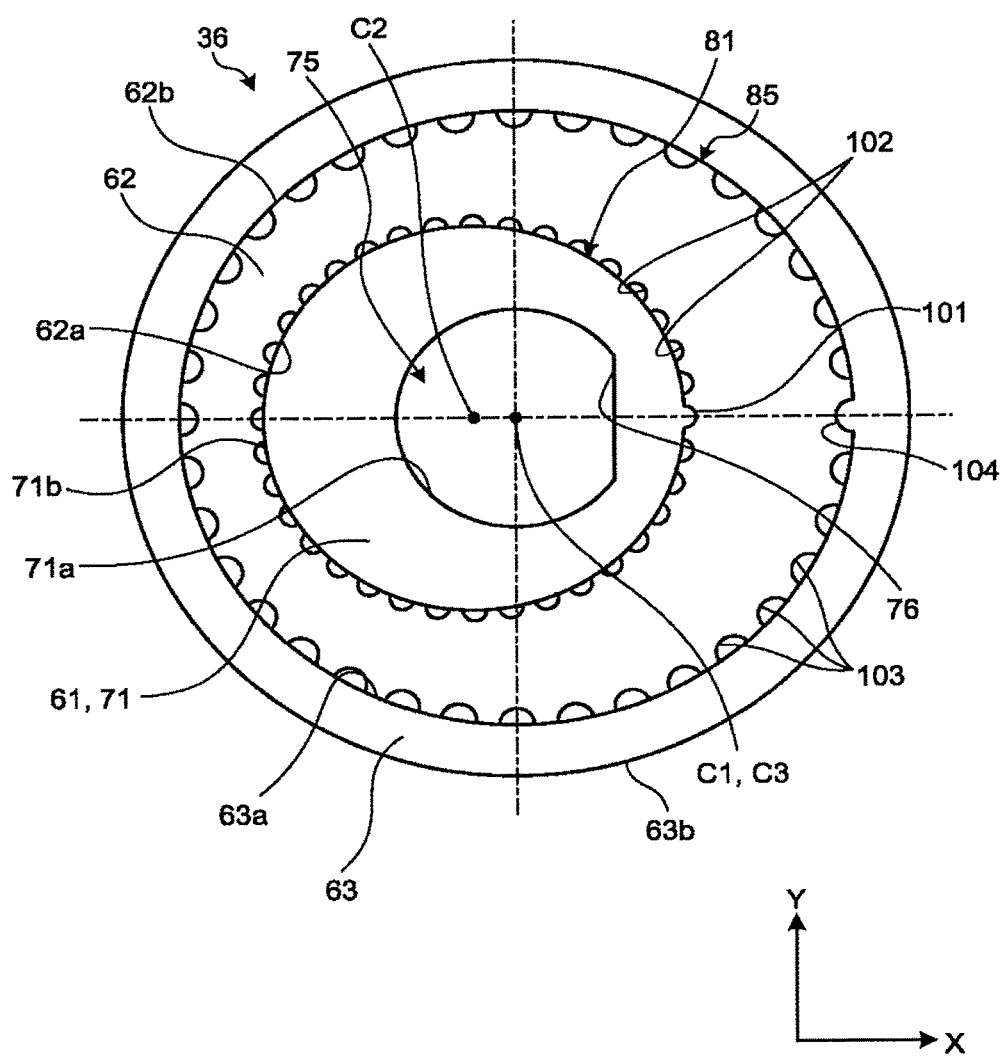
FIG. 11 is a plan view of the bush according to a third embodiment.
Figure 12:
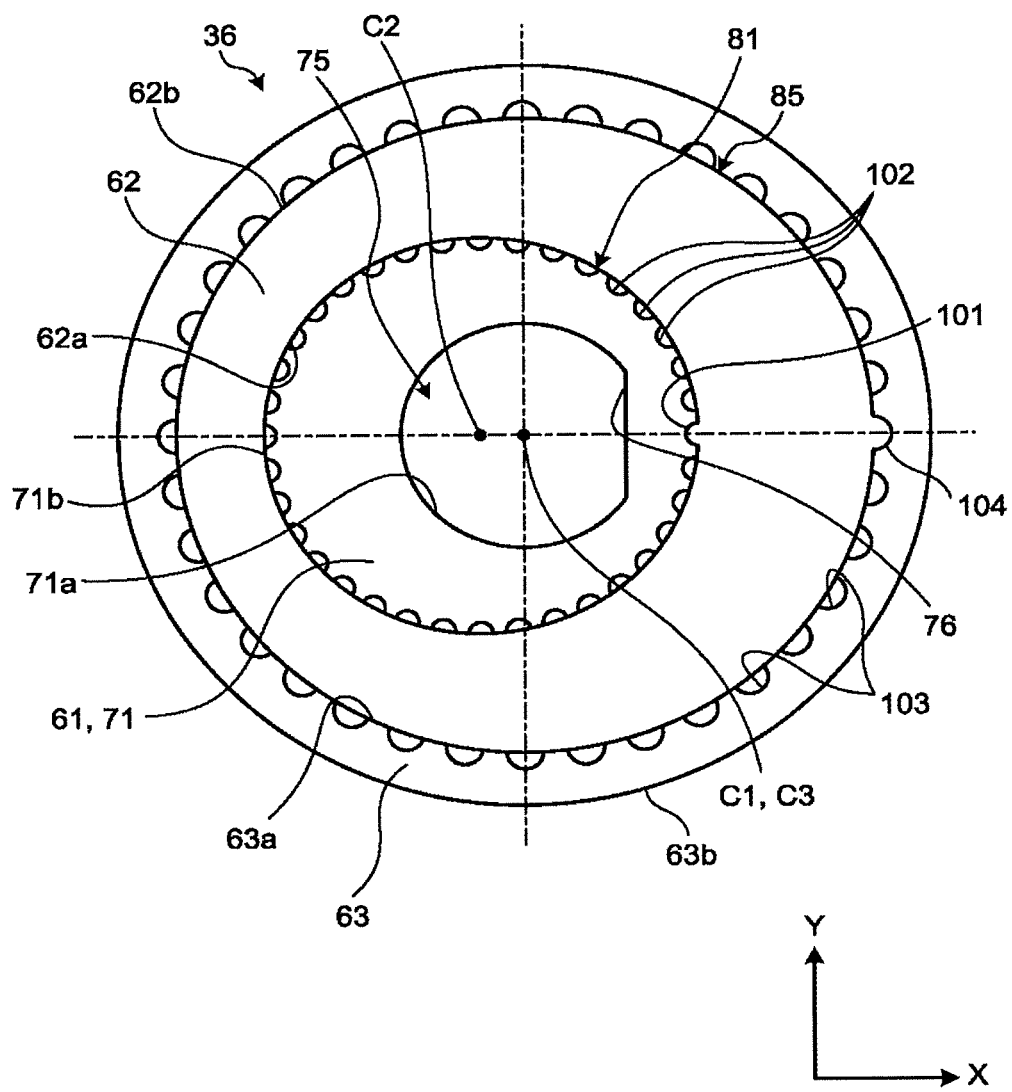
FIG. 12 is a plan view of the bush according to a first modification in the third embodiment.
Figure 13:
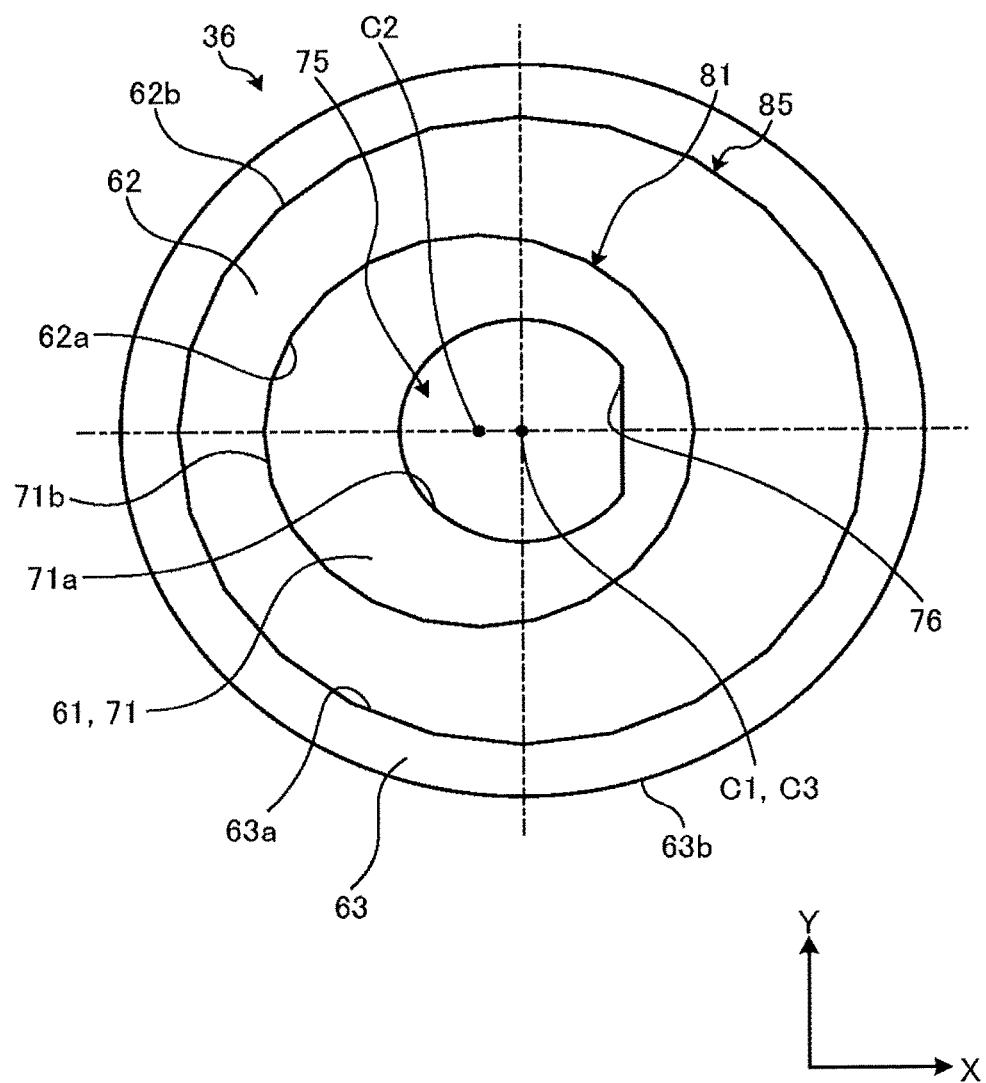
FIG. 13 is a plan view of the bush according to a second modification in the third embodiment.

With reference to FIG. 11 to FIG. 13, a third embodiment is described below. FIG. 11 is a plan view of the bush 36 according to the third embodiment. As illustrated in FIG. 11, in the third embodiment, the first outer surface 71b is provided with a first protrusion 101. The first protrusion 101 is a protrusion that extends in the direction along the Z-axis and has a substantially semicircular section that is convex in a direction departing from the second central axis C2. In other words, the first protrusion 101 extends parallel to the second central axis C2.

The second inner surface 62a is provided with a plurality of first recesses 102. The first recesses 102 are each a recess that extends in the direction along the Z-axis and has a substantially semicircular section that is convex in a direction radially departing from the second central axis C2. In other words, the first recesses 102 extend parallel to the second central axis C2. The ends of the first recesses 102 in the positive direction along the Z-axis and the negative direction along the Z-axis communicate with the second end faces 62c in the positive direction along the Z-axis and the negative direction along the Z-axis.

The first recesses 102 are arranged at regular intervals around the second central axis C2. The radius of each of the first recesses 102 is substantially equal to the radius of the first protrusion 101. The first protrusion 101 can enter the first recesses 102.

The second outer surface 62b is provided with a plurality of second recesses 103. The second recesses 103 are each a recess that extends in the direction along the Z-axis and has a substantially semicircular section that is convex toward the third central axis C3. In other words, the second recesses 103 extend parallel to the third central axis C3. The ends of the second recesses 103 in the positive direction along the Z-axis and the negative direction along the Z-axis communicate with the second end faces 62c in the positive direction along the Z-axis and the negative direction along the Z-axis. The second recesses 103 are arranged at regular intervals around the third central axis C3.

The third inner surface 63a is provided with a second protrusion 104. The second protrusion 104 is a protrusion that extends in the direction along the Z-axis and has a substantially semicircular section that is convex toward the third central axis C3. In other words, the second protrusion 104 extends parallel to the third central axis C3. The radius of the second protrusion 104 is substantially equal to the radius of each of the second recesses 103. The second protrusion 104 can enter the second recesses 103.

The tube 71 of the first member 61 is housed in the second hole 81 of the second member 62 so as to fit the first protrusion 101 into one of the first recesses 102. The first protrusion 101 and one of the first recesses 102 fit together, thereby inhibiting the first member 61 housed in the second hole 81 from rotating about the second central axis C2 relative to the second member 62. In other words, the second member 62 provided with the first recesses 102 inhibits the first member 61 housed in the second hole 81 from rotating about the second central axis C2 relative to the second member 62.

The second member 62 is housed in the third hole 85 of the third member 63 so as to fit the second protrusion 104 into one of the second recesses 103. The second protrusion 104 and one of the second recesses 103 fit together, thereby inhibiting the second member 62 housed in the third hole 85 from rotating about the third central axis C3 relative to the third member 63. In other words, the third member 63 provided with the second protrusion 104 inhibits the second member 62 housed in the third hole 85 from rotating about the third central axis C3 relative to the third member 63.

FIG. 12 is a plan view of the bush 36 according to a first modification in the third embodiment. As illustrated in FIG. 12, the first outer surface 71b may be provided with a plurality of first recesses 102, and the second inner surface 62a may be provided with a first protrusion 101. Furthermore, the second outer surface 62b may be provided with a second protrusion 104, and the third inner surface 63a may be provided with a plurality of second recesses 103.

FIG. 13 is a plan view of the bush 36 according to a second modification in the third embodiment. As illustrated in FIG. 13, the first outer surface 71b in the second modification is formed in a substantially 24-sided regular polygonal tubular shape extending with the second central axis C2 as a center.

The second hole 81 has a substantially 24-sided regular polygonal section centered on the second central axis C2 (as an axis of symmetry). Consequently, the second inner surface 62a is formed in a substantially 24-sided regular polygonal tubular shape extending with the second central axis C2 as a center. Furthermore, the second outer surface 62b is formed in a substantially 24-sided regular polygonal tubular shape extending with the third central axis C3 as a center.

The third hole 85 has a substantially 24-sided regular polygonal section centered on the third central axis C3 (as an axis of symmetry). Consequently, the third inner surface 63a is formed in a substantially 24-sided regular polygonal tubular shape extending with third central axis C3 as a center. Like this, the first outer surface 71b, the second inner surface 62a, the second outer surface 62b, and the third inner surface 63a may be formed in another tubular shape having rotational symmetry, not limited to the cylindrical shape.

The second inner surface 62a and the first outer surface 71b formed as described above are brought into contact with each other, whereby the second member 62 inhibits the first member 61 housed in the second hole 81 from rotating about the second central axis C2 relative to the second member 62. Furthermore, the third inner surface 63a and the second outer surface 62b formed as described above are brought into contact with each other, whereby the third member 63 inhibits the second member 62 housed in the third hole 85 from rotating about the third central axis C3 relative to the third member 63.

In the air conditioning device 10 according to the third embodiment and the first and second modifications in the third embodiment described above, the second member 62 inhibits the first member 61 housed in the second hole 81 from rotating about the second central axis C2 relative to the second member 62. The third member 63 inhibits the second member 62 housed in the third hole 85 from rotating about the third central axis C3 relative to the third member 63. Therefore, the shaft 33a inserted into the first hole 75 can surely apply torque to the rotating body such as the turbofan 34 mounted on the third member 63, for example.

In the air conditioning device 10 according to the third embodiment and the first modification in the third embodiment, the first protrusion 101 and one of the first recesses 102 provided on the first outer surface 71b and the second inner surface 62a, respectively, fit together, thereby inhibiting the first member 61 housed in the second hole 81 from rotating about the second central axis C2 relative to the second member 62. The second protrusion 104 and one of the second recesses 103 provided on the second outer surface 62b and the third inner surface 63a, respectively, fit together, thereby inhibiting the second member 62 housed in the third hole 85 from rotating about the third central axis C3 relative to the third member 63. Therefore, relative rotation among the first to third members 61 to 63 can be easily inhibited without welding or gluing.

In at least one embodiment described above, the first central axis of the first inner surface of the first member is different from the second central axis of the first outer surface. Furthermore, the second central axis of the second inner surface of the second member is different from the third central axis of the second outer surface. Therefore, the position of the first central axis can be made to coincide with the center of gravity of the rotating body on which the bush is mounted, for example, thus reducing the vibration of the rotating body.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A bush comprising:
a first member that is provided with a first hole having a first axis, and has a first inner surface defining the first hole and a first outer surface that is positioned opposite to the first inner surface and has a second axis, the second axis being different from the first axis;
a second member that is provided with a second hole that is coaxial with the first outer surface and in which the first member is housed, and has a second inner surface that defines the second hole and is in contact with the first outer surface and a second outer surface that is positioned opposite to the second inner surface and has a third axis, the third axis being different from the second axis; and
a third member that is provided with a third hole that is coaxial with the second outer surface and in which the second member is housed, and has a third inner surface that defines the third hole and is in contact with the second outer surface.

2. The bush according to claim 1, wherein
the second member is attachable to the first member at different angles about the second axis relative to the first member, and
the third member is attachable to the second member at different angles about the third axis relative to the second member.

3. The bush according to claim 1, wherein the first axis, the second axis, and the third axis are parallel to each other.

4. The bush according to claim 3, wherein a distance between the first axis and the second axis is equal to a distance between the second axis and the third axis.

5. The bush according to claim 1, wherein
the first outer surface is formed to be rotationally symmetric about the second axis,
the second inner surface is formed to be rotationally symmetric about the second axis,
the second outer surface is formed to be rotationally symmetric about the third axis, and
the third inner surface is formed to be rotationally symmetric about the third axis.

6. The bush according to claim 1, wherein
the second member is configured to inhibit the first member housed in the second hole from rotating about the second axis relative to the second member, and
the third member is configured to inhibit the second member housed in the third hole from rotating about the third axis relative to the third member.

7. The bush according to claim 6, wherein
the first outer surface is provided with one of a first protrusion and a plurality of first recesses,
the second inner surface is provided with the other of the first protrusion and the plurality of first recesses,
the second outer surface is provided with one of a second protrusion and a plurality of second recesses,
the third inner surface is provided with the other of the second protrusion and the plurality of second recesses,
the first protrusion and one of the first recesses fit together to inhibit the first member housed in the second hole from rotating about the second axis relative to the second member, and
the second protrusion and one of the second recesses fit together to inhibit the second member housed in the third hole from rotating about the third axis relative to the third member.

8. The bush according to claim 1, further comprising:
a first stopper; and
a second stopper, wherein
the first outer surface is provided with a first groove;
the second inner surface is provided with a second groove;
the second outer surface is provided with a third groove;
the third inner surface is provided with a fourth groove,
the first stopper is fit into the first groove and the second groove facing each other to inhibit the first member housed in the second hole from rotating about the second axis relative to the second member, and
the second stopper is fit into the third groove and the fourth groove facing each other to inhibit the second member housed in the third hole from rotating about the third axis relative to the third member.

9. A rotary machine comprising:
the bush according to claim 1; and
a power source that includes a shaft to be inserted into the first hole, the power source being capable of rotating the shaft.

10. An air conditioning apparatus comprising:
the bush according to claim 1;
a power source that includes a shaft to be inserted into the first hole, the power source being capable of rotating the shaft; and
a fan connected to the third member.

* * * * *